United States Patent
Collins et al.

(10) Patent No.: US 6,388,234 B1
(45) Date of Patent: May 14, 2002

(54) APPARATUS AND METHODS FOR DIRECTING AND FEEDING WIRE

(75) Inventors: Lonny David Collins, Osakis; Calice Gerard Courneya, Alexandria, both of MN (US)

(73) Assignee: Illinois Tool Works Inc., Glenview, IL (US)

(*) Notice: Subject to any disclaimer, the term of this patent is extended or adjusted under 35 U.S.C. 154(b) by 0 days.

(21) Appl. No.: 09/579,074

(22) Filed: May 25, 2000

(51) Int. Cl.[7] ............................................. B23K 9/133
(52) U.S. Cl. .............................. 219/137.7; 219/137.2; 228/244; 242/564.4
(58) Field of Search .......................... 219/137.7, 136, 219/137.2, 137.31, 137.61, 137.8; 228/244; 242/564.4

(56) References Cited

U.S. PATENT DOCUMENTS

| | | | |
|---|---|---|---|
| 2,093,394 A | | 9/1937 | Emery |
| 2,179,108 A | * | 11/1939 | Westberg ............... 219/137.61 |
| 2,719,245 A | | 9/1955 | Anderson |
| 3,038,059 A | * | 6/1962 | Hinrichs ............... 219/137.61 |
| 3,089,022 A | | 5/1963 | Kinney |
| 3,172,991 A | | 3/1965 | Arnoldy |
| 3,279,669 A | * | 10/1966 | Bernard et al. ......... 219/137.2 |
| 3,470,349 A | | 9/1969 | Sievers |
| 3,562,577 A | | 2/1971 | Kensrue |
| 3,644,701 A | | 2/1972 | Kobayashi et al. |
| 3,718,798 A | | 2/1973 | Randolph et al. |
| 3,811,611 A | | 5/1974 | Tholander et al. |
| 4,098,445 A | | 7/1978 | Samokovliski et al. |
| 4,205,771 A | | 6/1980 | Samokovliski et al. |
| 4,315,358 A | * | 2/1982 | Hedel ..................... 219/137.7 |
| 4,539,465 A | | 9/1985 | Bosna |
| 4,665,300 A | | 5/1987 | Bellefleur |
| 4,757,180 A | | 7/1988 | Kainz et al. |
| 4,954,690 A | | 9/1990 | Kensrue |
| 5,326,958 A | | 7/1994 | Geus |
| 5,410,126 A | | 4/1995 | Miller et al. |
| 5,584,426 A | | 12/1996 | Ziesenis |
| 5,836,539 A | | 11/1998 | Grimm et al. |

* cited by examiner

Primary Examiner—Clifford C. Shaw
(74) Attorney, Agent, or Firm—Donald J. Breh; Alan D. Kamrath; Rider, Bennett, Egan & Arundel, LLP

(57) ABSTRACT

Apparatus for directing and feeding wire (W) such as for a welder includes first and second, generally planar, guide plates (108) which are slid in a direction parallel to the movement path of the wire (W) into a slit (74) of a mount (68) and a slot (64) of an adapter element (44). A driven roll (20) penetrates an opening (112) in the first guide plate (108). A pressure roll (82) is pivotably mounted to mount (68) between a drive position where it penetrates an opening (112) in the second guide plate (108) and sandwiches wire (W) against the driven roll (20) and a disengaged position. The pressure roll (82) is removably held in the drive position by abutment of a washer (104) with the bracket (84) to which pressure roll (82) is rotatably mounted. The washer (104) is slideable upon a shaft (98) and biased toward the bracket (84) by a spring (106), with the shaft (98) being pivotably mounted to a connecting block (24) between a latched and unlatched position. The adapter element (44) is slideably received in the connector block (24).

22 Claims, 2 Drawing Sheets

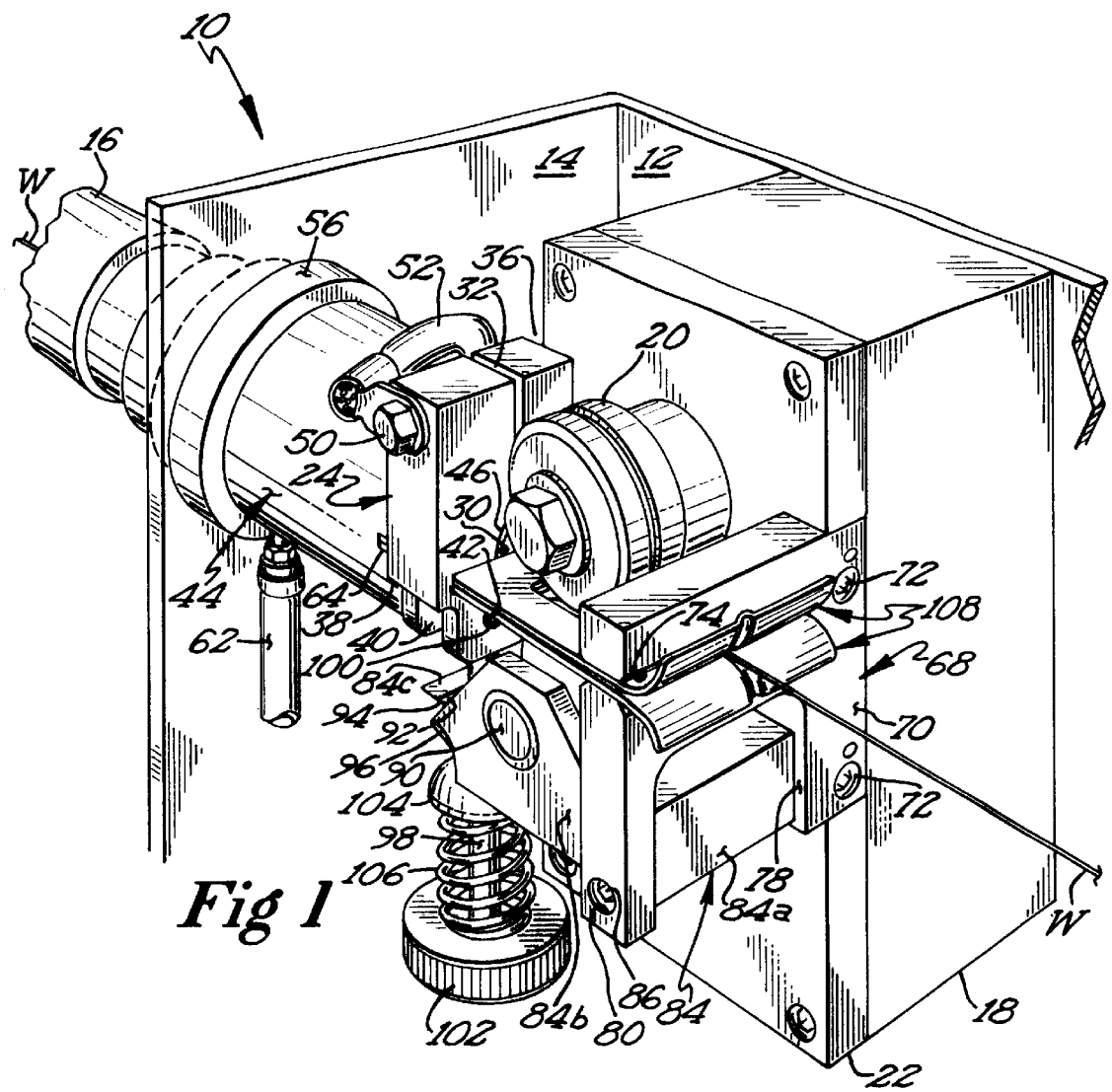
Fig 1
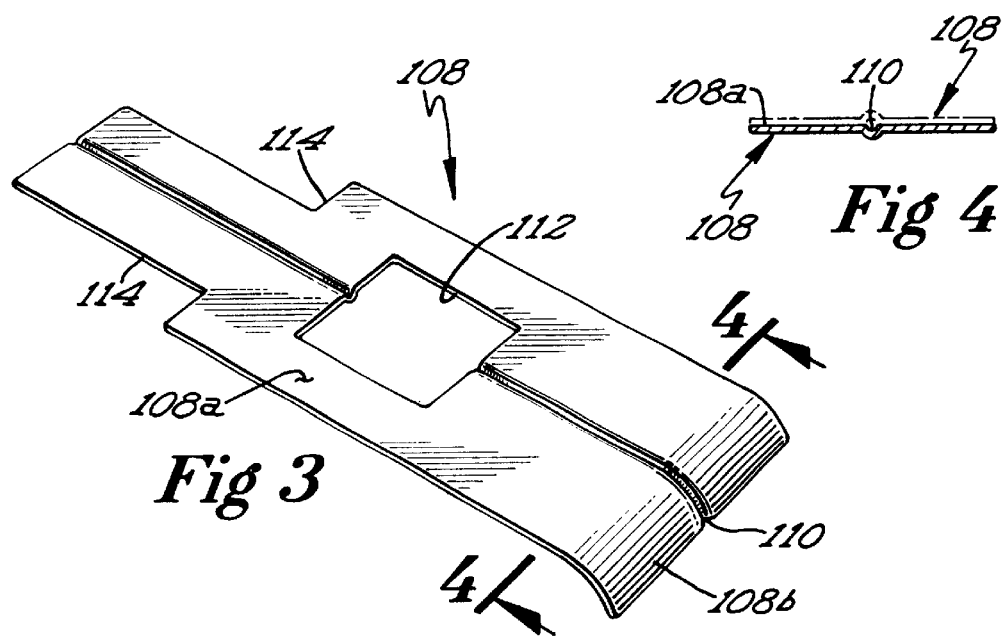
Fig 3
Fig 4

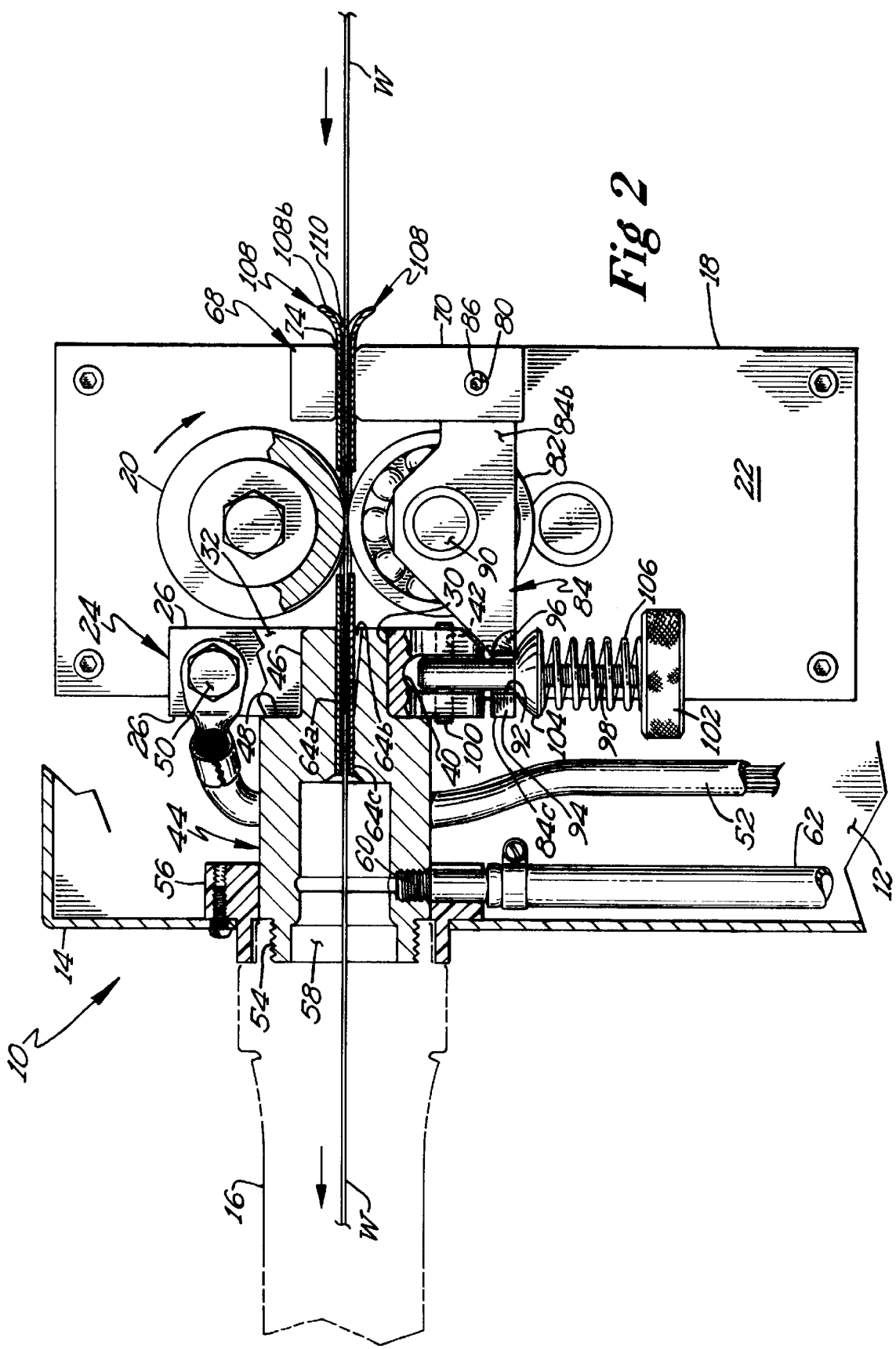

APPARATUS AND METHODS FOR DIRECTING AND FEEDING WIRE

BACKGROUND

The present invention generally relates to apparatus and methods for directing and feeding wire and in most preferred aspects to wire directing and feeding apparatus and methods for welders.

Directing wire to its destination or point where it is put to use requires the use of devices including, but not limited to, rolls, orifices, spools, drums, blossoms or other freeforms. One process where it is necessary to direct wire is where wire is used for joining materials by wire welding. This process involves the controlled process of delivering electrified wire to a workpiece. An electric circuit is completed at the junction where the electrified wire contacts the workpiece. This point of contact has the highest electrical resistance of any point in the circuit and therefore results in the point of highest heat. The controlled delivery of electrified wire must be at a rate sufficient to fuse the workpiece and wire to yield the desired properties.

Historically, the mechanics to propel and guide wire to the workpiece utilized a minimum of one driven roll and one pressure roll to insure mechanical contact of the wire to the driven roll. The wire is pulled into the driven and pressure rolls through an orifice type wire guide and pushed out of the driven and pressure rolls through a second orifice type guide and into a wire guide tube towards a mechanism that directs the wire to the workpiece. This latter device is commonly referred to as a gun. This gun is manually or automatically positioned to direct the wire to the junction being welded.

Prior wire guides at the entrance and exit of the drive rolls are subject to a great quantity of abrasion, resulting in short life of the orifice diameter and increased mechanical resistance in the system. When the mechanical resistance becomes excessive, soft wire will pile up in backlash fashion that results in work delays and shortened tempers. There is a consequent need for frequent changes of prior orifice wire guides. The replacement of these wire guides requires that the wire be removed and then rethreaded through the system after the guides have been replaced. Adept fingers and small tools are required to replace the many small parts of prior wire guides. In a cramped space with big cold fingers and very low light, the process can be very challenging. Frequently, parts are lost inside the system and can cause serious damage and delays in work. Under these conditions, threading the wire into an orifice again can alter the attitude of the finest craftsman.

Thus, a need exists for novel methods and apparatus for directing and feeding wire which circumvents all the deficiencies and overcomes the problems of prior wire feeding apparatus and methods.

SUMMARY

This need and other problems in the field of wire directing and feeding and especially in the field of wire feeding in welders has been satisfied by providing, in the preferred form, first and second guide plates which are removably held with their first surfaces of linear portions abutting together and including a trough extending through the linear portions and of a size for slideable receipt of the wire and which are positionable in the apparatus by movement of at least one of the guide plates in a direction parallel to the movement direction of the wire.

In preferred aspects of the present invention, the wire is drawn by being captured between counterrotating driven roll and pressure roll extending through openings in the first and second guide plates, respectively. In most preferred aspects, the guide plates are slid parallel to the wire feed direction through a slit of a mount and into a slot of an adapter element, with the guide plates being held in position by receipt of the rolls in the openings of the guide plates. Additionally, in most preferred aspects, the driven roll is stationary relative to the slit and the slot and the slot includes an entry portion allowing insertion of the first guide plate by canting past the driven roll.

It is thus an object of the present invention to provide novel apparatus and methods for directing wire.

It is further an object of the present invention to provide such novel wire directing apparatus and methods having particular utility in connection with welders.

It is further an object of the present invention to provide such novel wire directing apparatus and methods which feed the wire.

It is further an object of the present invention to provide such novel wire directing apparatus and methods including guides which can be removed and replaced without the use of tools.

It is further an object of the present invention to provide such novel wire directing apparatus and methods which does not include small, easily lost components.

It is further an object of the present invention to provide such novel wire directing apparatus and methods including guides having extended life and minimizing, if not eliminating, the need for replacement.

It is further an object of the present invention to provide such novel wire directing apparatus and methods including guides which minimize mechanical resistance to wire movement.

It is further an object of the present invention to provide such novel wire directing apparatus and methods including guides which can be replaced without requiring removal and rethreading of the wire.

It is further an object of the present invention to provide such novel wire directing apparatus and methods including guides having a tubular track rather than being of an orifice type.

It is further an object of the present invention to provide such novel wire directing apparatus and methods including easily fabricated and assembled components of a minimal number.

It is further an object of the present invention to provide such novel wire directing apparatus and methods including guides which can be easily replaced in low light, cramped spaces.

These and further objects and advantages of the present invention will become clearer in light of the following detailed description of an illustrative embodiment of this invention described in connection with the drawings.

BRIEF DESCRIPTION OF THE DRAWINGS

The illustrative embodiment may best be described by reference to the accompanying drawings where:

FIG. 1 shows a perspective view of an apparatus for directing and feeding wire in accordance with the preferred teachings of the present invention mounted in the cabinet of a welder which is only partially shown.

FIG. 2 shows a side view of the wire directing and feeding apparatus of FIG. 1 with portions shown in cross section and broken away to show constructional details.

FIG. 3 shows a perspective view of a guide plate utilized in the wire directing and feeding apparatus of FIG. 1.

FIG. 4 shows a cross sectional view of the guide plate of FIG. 3 according to section line 4—4 of FIG. 3.

All Figures are drawn for ease of explanation of the basic teachings of the present invention only; the extensions of the Figures with respect to number, position, relationship, and dimensions of the parts to form the preferred embodiment will be explained or will be within the skill of the art after the following teachings of the present invention have been read and understood. Further, the exact dimensions and dimensional proportions to conform to specific force, weight, strength, and similar requirements will likewise be within the skill of the art after the following teachings of the present invention have been read and understood.

Where used in the various figures of the drawings, the same numerals designate the same or similar parts. Furthermore, when the terms "first", "second", "side", "end", "inner", "outer", "upper", "lower", "longitudinal", "edge", and similar terms are used herein, it should be understood that these terms have reference only to the structure shown in the drawings as it would appear to a person viewing the drawings and are utilized only to facilitate describing the preferred embodiment.

DESCRIPTION OF THE PREFERRED EMBODIMENT

Apparatus for directing and feeding wire utilizing methods according to the preferred teachings of the present invention is shown in the drawings and generally designated 10. In a most preferred form of the present invention, apparatus 10 is utilized in a welder including a cabinet including a back wall 12 and a side wall 14 and including a wire guide tube 16 leading to a welding gun, not shown. For purposes of explanation, the welder includes a housing 18 mounted to back wall 12 and which is electrically insulated from back wall 12 and the cabinet. Housing 18 encloses a drive motor and transmission of any conventional design and for driving a driven roll 20 extending through the front cover 22 of housing 18. It is common that driven roll 20 includes a perimeter groove to increase the contact area with wire W. According to the preferred teachings of the present invention, the cabinet, housing 18 and driven roll 20 are of a type utilized in prior systems, with apparatus 10 in the preferred form shown being designed to match these components. It can then be appreciated that system 10 can be designed to interfit with components of other styles and types according to the teachings of the present invention.

Generally, apparatus 10 according to the teachings of the present invention includes an annular contact block 24 formed of electrically conductive material such as brass. In the most preferred form, block 24 is machined from flat, stock material, includes first and second faces 26 and has a generally rectangular periphery. In the most preferred form, the corner between the top and back edges includes a rectangular shaped cut-out 36, and cover 22 includes a notch for receipt of the back edge of block 24 below cut-out 36. Block 24 is suitably secured to housing 18 such as by bolts and alignment dowels extending through faces 26 parallel to back wall 12 and threaded and slideably received into the side edge of cover 22, respectively. A center aperture 30 extends through block 24 between faces 26. A collapsible cut or slit 32 extends between faces 26 from the top edge to aperture 30. A through bore extends between the front and back edges and through slit 32 with the through bore terminating in the cut-out 36. In the most preferred form, the through bore is threaded between the slit 32 and cut-out 36. The corner between the bottom and front edges includes an L-shaped cut-out 38. A channel 40 is cut from the bottom and front edges of cut-out 38 to define first and second pivot ears, with a through hole 42 extending between faces 26 and intersecting with channel 40.

Apparatus 10 according to the teachings of the present invention includes an adapter element 44 formed of electrically conductive material. The inner end of element 44 includes a stepped down portion 46 having a periphery corresponding to and for slideable receipt in aperture 30. Stepped down portion 46 defines a shoulder 48 in element 44. Element 44 is secured to block 24 by receipt of portion 46 in aperture 30 until the first face 26 of block 24 abuts with shoulder 48 and by being clamped therein by a bolt 50 located and threaded in the through bore which collapses slit 32. In the most preferred form, the terminal end of an electrical connection 52 is sandwiched by bolt 50 against the front edge of block 24. It can then be appreciated that since block 24 and element 44 are formed of electrically conductive material, electrical energy can be conducted therethrough from electrical connection 52.

The outer end of element 44 includes a threaded, stepped down portion 54 having a periphery corresponding to and for threadable receipt of wire guide tube 16. An annular electrical insulator 56 is slideably received on the periphery of adapter element 44 adjacent portion 54 and the outer end of adapter element 44 opposite portion 46. Insulator 56 has multiple functions. First, insulator 56 is received in an aperture formed in side wall 14 and provides mechanical support for element 44 by side wall 14. Second, insulator 56 electrically insulates element 44 from side wall 14 and the cabinet. Additionally, insulator 56 cooperates in the connection between element 44 and wire guide tube 16. According to the preferred teachings of the present invention, elements 44 are provided to connect to each of the wire guide tubes 16 of various manufacturers. The operator would install element 44 according to the particular wire guide tube 16 desired to be connected to portion 54 of element 44. In the event that a wire guide tube 16 of a different style was desired to be utilized in the future, the operator would simply remove element 44 and install a different element 44 corresponding to the wire guide tube 16 desired to be utilized. It should be appreciated that wire guide 16 can be removed and replaced from outside of the cabinet and without requiring disassembly of any other components of apparatus 10 according to the teachings of the present invention.

Adapter element 44 includes a counter bore 58 extending from the outer end towards but spaced from stepped down portion 46, with counter bore 58 being shaped for receipt of wire guide tube 16. A passage 60 extends from the outer periphery of element 44 and intersects with counter bore 58. A gas line 62 passes through insulator 56 and is suitably sealed to element 44 and is in fluid communication with passage 60. Thus, wire guide tube 16 can be in fluid communication with a source of welding gas through counter bore 58, passage 60, and line 62.

Adapter element 44 according to the teachings of the present invention includes a diametric slot 64 extending from the inner end towards and intersecting with counter bore 58. The upper surface 64a in element 44 defining slot 64 is generally planar along its entire axial extent and is in a plane spaced from and generally parallel to the axis of counter bore 58. Slot 64 includes an entry portion 64b which is generally planar, is spaced from surface 64a and extends from and angles inwardly from the inner end towards but is axially spaced from counter bore 58 and shoulder 48. In the most preferred form, portion 64b extends at an angle in the order of 4° relative to surface 64a. Slot 64 further includes an inner portion or lower surface 64c which is generally planar and is in a spaced, parallel relation to surface 64a. The inner end of element 44 includes an axial, frustoconical countersink for assisting in the insertion and removal of a wire guide.

Apparatus 10 further includes a mount 68 according to the teachings of the present invention. In the most preferred form, mount 68 is machined from flat, stock material, includes first and second faces 70 and has a generally rectangular periphery. Mount 68 is suitably secured to housing 18 such as by bolts 72 and alignment dowels extending through faces 70 parallel to back wall 12 and threaded and slideably received into the side edge of cover 22, respectively, with cover 22 including a notch in the most preferred form for receiving the back edge of mount 68. A slit 74 is formed between faces 70 and extends from the front edge towards but spaced from the back edge. The corners between slit 74 and faces 70 are chamfered. A channel having circular cross sections of a diameter greater than the width of slit 74 and in the most preferred form of a diameter generally equal to the greatest spacing between the chamfered corners of slit 74 is provided in mount 68, with slit 74 extending diametrically through the channel and with the channel located generally intermediate the ends of slit 74. In the most preferred form, the upper surface of slit 74 is generally co-planar with upper surface 64a of slot 64, with the periphery of driven roll 20 extending beyond the plane extending through the upper surface of slit 74 and upper surface 64a. The lower surface of slit 74 is generally co-planar with lower surface 64c of slot 64. A generally U-shaped cut-out 78 extends from the lower edge of mount 68 to define first and second pivot ears, with a through hole 80 extending between the outer edge and the inner edge and intersecting with cut-out 78, with hole 80 being threaded from the inner edge to cut-out 78 in the most preferred form.

Apparatus 10 according to the teachings of the present invention further includes a pressure roll 82 for engagement with driven roll 20. In the most preferred form, pressure roll 82 is the outer race of a purchased, conventional roller bearing. In the preferred form, suitable provisions are provided to allow radial movement of pressure roll 82 between an engaged, drive position and a disengaged position relative to driven roll 20. Specifically, in the most preferred form, apparatus 10 includes a bracket 84 having a first end in the form of a lug 84a of a width generally equal to cutout 78. A bolt 86 extends through hole 80 from outer edge of mount 68 to cut-out 78, extends through a through hole formed in lug 84a, and is threaded into hole 80 from cut-out 78 towards the inner edge of mount 68. Thus, bracket 84 is pivotally mounted to mount 68 about a pivot axis defined by bolt 86.

Bracket 84 includes a central portion 84b to which pressure roll 82 is rotatably mounted. In the most preferred form, central portion 84b is annular shaped, with pressure roll 82 being mounted by an axle 90 extending between upstanding, spaced parallel ears formed on central portion 84b.

Bracket 84 further includes a connector portion 84c, with central portion 84b located intermediate lug 84a and connector portion 84c. In the most preferred form, connector portion 84c is in the form of a planar projection including a U-shaped indentation 92 extending from the front edge towards but spaced from the back edge and spaced inwardly from the end edge thereof. The width of indentation 92 is generally equal to the width of channel 40 of contact block 24. In the most preferred form, the corner between the front edge and the lower face of connector portion 84b includes a chamfer 94 having an angle in the order of 40° in the preferred form. In the most preferred form, central portion 84b and connector portion 84c include an arcuate shaped cut-out 96 in the front edge thereof.

Further, in the most preferred form, apparatus 10 includes a locking shaft 98 of a diameter generally equal to and for receipt in channel 40 of contact block 24 and indentation 92 of bracket 84. Shaft 98 has a first end in the form of a lug of a width generally equal to channel 40. A pivot pin 100 extends through hole 42 from the first face 26 of contact block 24 to channel 40, extends through a through hole formed in the end of shaft 98, and extends through hole 42 from channel 40 to the second face 26 of contact block 24. Thus, shaft 98 is pivotable about a pivot axis defined by pivot pin 100. The second end of shaft 98 includes threads for threadable receipt of an adjustment nut 102. A washer 104 is slideably positioned on shaft 98 between the first end and nut 102. A coil spring 106 is sandwiched between washer 104 and nut 102. The radial surface of washer 104 opposite to coil spring 106 is chamfered to cam upon chamfers 94 of connector portion 84c of bracket 84.

For the sake of explanation, it will be assumed that pressure roll 82 is in its disengaged position, with bracket 84 extending generally vertically downward from mount 68 and shaft 98 extending generally vertically downward from contact block 24. Shaft 98 can be pivoted about pivot pin 100 out of its vertical condition to allow bracket 84 to be pivoted out of its vertical condition to a generally horizontal condition where pressure roll 82 engages driven roll 20. At that time, shaft 98 can be pivoted about pivot pin 100 back towards its vertical condition. When shaft 98 is so pivoted, washer 104 will engage with connector portion 84c, and the upper chamfered radial surface of washer 104 will cam upon chamfers 94 to slide below the lower face of bracket 84 with shaft 98 being received in indentation 92. It can then be appreciated that pressure roll 82 is held in its engaged position under bias of spring 106, with the amount of bias or in other words the amount of pressure at which pressure roll 82 engages driven roll 20 being adjustable by threading or unthreading adjustment nut 102 on shaft 98.

Apparatus 10 according to the teachings of the present invention includes first and second guide plates 108 which in the most preferred form are of identical construction. Specifically, each guide plate 108 is generally rectangular shaped and includes an elongated linear portion 108a having a first end 108b curved at a radius to form a ski shape. Additionally, an embossed U-shaped trough 110 extends between the ends of plates 108 through linear portion 108a and generally intermediate the side edges thereof and along the longitudinal center line of plates 108, with trough 110 having generally semicircular cross sections in the most preferred form. An opening 112 of a generally square configuration is formed generally intermediate the ends of plate 108 having a width generally equal to but slightly larger than the width of rolls 20 and 82. The second end of each plate 108 includes first and second rectangular cut-outs 114, with the length of cut-outs 114 being generally equal to the length of slot 64 and the spacing between cut-outs 114 being generally equal to the diameter of stepped down portion 46, the width of slot 64, and the diameter of aperture 30. In the most preferred form of the present invention, plates 108 are formed by stamping from flat sheet stock of a thickness generally equal to but slightly less than the distance between upper surface 64a and lower surface 64c of slot 64. In the most preferred form, plates 108 are formed from annealed spring steel but can be formed from a variety of materials which are preferably treated or otherwise includes a surface chemical complex for increasing hardness and/or increasing lubricity in a manner to reduce friction and/or to increase wear resistance.

It should be appreciated that guide plates 108 can be installed in the following manner. Specifically, it is assumed that a wire W has been prethreaded into slit 74 of mount 68, under driven roll 20, into slot 64 and counter bore 58 of adapter element 44 and into wire guide tube 16 and that pressure roll 82 is in its disengaged condition. The second end of the first guide plate 108 closest to driven roll 20 which is the upper one in the preferred form shown is inserted between driven roll 20 and wire W by movement towards adapter element 44 in a direction parallel to wire W in slit 74 with trough 110 and end 108b extending upwardly and wire W received in trough 110. It should be appreciated that the first guide plate 108 can not be extended horizontally as driven roll 20 is located in the plane of the upper surface of slit 74 and upper surface 64a. However, the first guide plate 108 can be extended at an angle with the second end moving along entry portion 64b such that guide plate 108 is able to pass below driven roll 20. In this regard, entry portion 64b extends toward slit 74 at an angle which is nonparallel to lower surface 64c and away from upper surface 64a. When the second end of the first guide plate 108 reaches lower surface 64c, driven roll 20 will enter opening 112, with guide plate 108 being slid into element 44 until the end of cut-outs 114 abut with the second face 26 of contact block 24. It should be appreciated that the perimeter groove of the driven roll 20 should be colinear with trough 110 of the first guide plate 108. At that time, the second guide plate 108 can be slid beneath wire W into slit 74 with trough 110 and end 108b extending downwardly, with the first surface of the second guide plate 108 sliding upon the first surface of the first, upper guide plate 108 and with wire W received in trough 110 of the second, lower guide plate 108. As pressure roll 82 is in its disengaged position, the second guide plate 108 can be extended horizontally into slot 64 until the end of cut-outs 114 abut with the second face 26 of contact block 24. In the most preferred form, the second ends of guide plates 108 are closely adjacent counter bore 58 such that wire W is received in wire guide tube 16 directly from troughs 110 of guide plates 108. It should then be appreciated that due to the thickness of the first and second guide plates 108 being generally equal to the spacing between surfaces 64a and 64c, the second guide plate 108 holds the first, upper guide plate 108 against upper surface 64a of slot 64 and the upper surface of slit 74. It can then be appreciated that the first, upper guide plate 108 is prevented from moving by the receipt of driven roll 20 in opening 112 by the abutment of the sides of cut-outs 114 with aperture 30 and by abutment by the second, lower guide plate 108.

After the second, lower guide plate 108 is in place, pressure roll 82 can be moved from its disengaged position to its engaged position by pivoting bracket 84 from a vertical condition to a horizontal condition. Pressure roll 82 is secured in its engaged position by pivoting shaft 98 about pivot pin 100 and into indentation 92 of bracket 84, with washer 104 camming under connector portion 84c due to chamfers 94 and cut-out 96 and the chamfered configuration of washer 104. With washer 104 abutting with the lower face of bracket 84, bracket 84 and pressure roll 82 carried thereby are held in the engaged position under the bias of spring 106. It should then be appreciated that in the engaged position, pressure roll 82 extends through opening 112 of the second, lower guide plate 108 and engages with driven roll 20. Thus, it can then be appreciated that the second, lower guide plate 108 is prevented from moving by the receipt of pressure roll 82 in opening 112 by the abutment of the sides of cut-outs 114 with aperture 30 of contact block 24 and by the abutment with the first, upper guide plate 108. To remove guide plates 108 from apparatus 10, the above procedure is simply reversed.

It should be appreciated that the guide of apparatus 10 for directing wire W according to the teachings of the present invention formed by guide plates 108 is advantageous for several reasons. Specifically, guide plates 108 are relatively large components of a generally planar configuration. Particularly, because of their large size, guide plates 108 can be easily manually handled by technicians including in dark environments and with minimal risk of dropping and which can be easily found and retrieved if dropped. Additionally, when placed with their first surfaces abutting, troughs 110 of guide plates form a tubular track or tunnel of a generally circular cross section for receipt of wire W. Also, ends 108b radiused away from trough 110 form a funnel-like entry to the tubular track formed by troughs 110 so that ends 108 provide a large guiding surface to effect entry of wire W into the entry of the tubular track formed by troughs 110. Wire W is directed by troughs 110 of an elongated length so that troughs 110 can have a diametric size for slideable receipt of wire W with minimal tolerances relative to the diametric extent or size of wire W. Thus, guide plates 108 can be utilized with a wide range or family of diametric sizes of wire W such that guide plates 108 do not necessarily need to be changed if it is desired to feed wire W of a different diametric extent. As wire W is able to easily pass through troughs 110, abrasion of guide plates 108 by wire W is minimized such that mechanical resistance to movement of wire W is also minimized and guide plates 108 need not be formed from expensive material that are abrasive resistant. Furthermore, guide plates 108 can be removed and replaced without the use of tools and in the most preferred form, by simply pivoting shaft 98 between its latched position and unlatched position to thereby move pressure roll 82 between its engaged and disengaged position, with guide plates 108 being slideable from adapter element 44 and mount 68 when pressure roll 82 is in its disengaged position. Additionally, wire W can be easily threaded in apparatus 10 according to the teachings of the present invention with guide plates 108 removed by threading through slit 74, through slot 64 and into counter bore 58 and wire guide tube 16, and with guide plates 108 being replaced in apparatus 10 after wire W has been threaded.

It should further be appreciated that the wire guide defined by guide plates 108 in the most preferred form can be installed or removed with wire W being either threaded or unthreaded and without the use of tools. In particular, guide plates 108 are held in position by their slideable receipt in slot 64 and slit 74 and by the receipt of rolls 20 and 82 in openings 112. In this regard, the spacing of slot 64 and slit 74 between the upper and lower surfaces 64a and 64c thereof being of a distance generally equal to the thickness of first and second guide plates 108 with the first surfaces of linear portions 108a abutting holds guide plates 108 with the first surfaces of linear portion 108a abutting and specifically prevents guide plates 108 from separating. Further, the upper and lower surfaces of slot 64 and slit 74 can include channels for receipt of troughs 110 extending beyond the planar portions of the second surfaces of linear portions 108a of guide plates 108 to act as a guide and positioner in the slideable movement of guide plates 108 in a direction parallel to the movement direction of wire W. Furthermore, the slideable receipt of guide plates 108 in slot 64 and aperture 30 and in particular the abutment of the edges of cut-outs 114 with the inside surfaces of aperture 30 and face 26 of block 24 maintain openings 112 in position for penetration and receipt of rolls 20 and 82 to contact wire W, with the receipt of rolls 20 and 82 in openings 112 preventing removal of guide plate 108 from slot 64 and slit 74. Further, to allow removal of the lower guide plate 108 from apparatus 10, it is only necessary to grasp nut 102 with the fingers and pull outward thereby pivoting locking shaft 98 from its latched position to its unlatched position. Bracket 84 is then free to pivot from its drive position to its disengaged position. When bracket 84 is in its disengaged position, pressure roll 82 no longer penetrates opening 112 of the second, lower guide plate 108. End 108b of the second, lower guide plate 108 can then be grasped with the technician's fingers and the second lower guide plate 108 slid from slot 64 and slit 74 in a direction parallel to the movement direction of wire W. Once the second, lower guide plate 108 has been removed, end 108b of the first, upper guide plate 108 can then be grasped with the technician's fingers and the first, upper guide plate 108 slid from slot 64 and slit 74 in a direction parallel to the movement direction of wire W. To install guide plates 108 in apparatus 10, this procedure is simply reversed. It can then be appreciated that the removal and installation of guide plates 108 can be accomplished according to the teachings of the present invention without the use of tools of any kind being needed. Additionally, because of the simplicity of apparatus 10 according to the teachings of the present invention, a technician familiar with apparatus 10 can remove and install guide plates 108 in the dark or without requiring visual verification. In this regard, the nonconical flare or funnel shape provided by ends 108b facilitates easy entry of wire W if it is desired to thread wire W with guide plates 108 installed in apparatus 10 and provides handles for grasping when it is desired to remove or install guide plates 108 whether or not wire W is present.

In use in a welder, a shielding gas is supplied through gas line 62 to element 44 and to passage 60 for supplying to wire guide tube 16 and to the welding gun connected thereto for communication unto the workpiece. Electrical energy is supplied to wire W from electrical connector 52 to block 24 through bolt 50, and from block 24 to adapter element 44 and thereby to wire W passing therethrough. Thus, when the end of wire W contacts the workpiece, the workpiece and wire W are fused. As wire W is consumed in the welding process, driven roll 20 is rotated to feed wire W at a rate corresponding to the rate of consumption.

Now that the basic construction and a method of operation of apparatus 10 according to the teachings of the present invention has been set forth, many extensions and variations will be obvious to a person skilled in the art. As an example, although guide plates 108 in the most preferred form are of an identical construction and are believed to be advantageous for several reasons including but not limited to inventory reductions and ease of assembly as either guide plate 108 can be the upper or the lower guide plate 108 in apparatus 10, guide plates 108 could be formed as dissimilar components. As an example, trough 110 for receiving the wire W could be formed in a single guide plate 108 and closed by the other guide plate 108 having a planar configuration.

Similarly, although the provision of entry portion 84b is believed to be advantageous in the installation and removal of the upper guide plate 108 in apparatus 10, other manners of installation and removal of guide plates 108 can be utilized according to the teachings of the present invention including but not limited to moveably mounting driven roll 20 and/or adapter element 44 relative to housing 18.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Apparatus for directing wire having a diametric extent comprising, in combination: first and second guide plates, with the guide plates each including a linear portion, a first surface and a second surface, with the first surface of the linear portion being generally planar, with the guide plates being removably held with their first surfaces of the linear portions abutting together, with at least one of the guide plates including a trough extending through the linear portion having a size for slideable receipt of the wire, with the guide plates being positionable on the wire with the first surfaces of the linear portions abutting, wherein the guide plates each further includes a first end curved upwardly from the first surface towards the second surface.

2. The apparatus of claim 1 wherein each of the guide plates includes a trough.

3. The apparatus of claim 2 wherein the trough continues through the first end.

4. The apparatus of claim 3 wherein the first and second guide plates are of identical construction.

5. Apparatus for directing wire having a diametric extent comprising, in combination: first and second guide plates, with the guide plates each including a linear portion, a first surface and a second surface, with the guide plates being removably held with their first surfaces of the linear portions abutting together, with the wire being received between the first and second guide plates, with the guide plates being positionable on the wire with the first surfaces of the linear portions abutting, wherein each of the guide plates includes an opening, with the guide plates being held relative to a driven roll; and a pressure roll moveable relative to the driven roll between a drive position and a disengaged position, with the wire being captured between the driven roll and the pressure roll in the drive position, with the driven roll extending through the opening of the first guide plate in the drive position and the pressure roll extending through the opening of the second guide plate in the drive position.

6. The apparatus of claim 5 further comprising, in combination: a mount; and a bracket, with the pressure roll being rotatably mounted to the bracket, with the bracket being pivotally mounted to the mount between the drive position and the disengaged position, with the bracket being removably held in the drive position.

7. The apparatus of claim 6 further comprising, in combination: a block; and a shaft pivotally mounted to the block between a latched position and an unlatched position, with the shaft in the latched position latching with the bracket to hold the bracket in the drive position.

8. The apparatus of claim 7 further comprising, in combination: a washer slideably mounted on the shaft, with the washer being abuttable with the bracket in the latched position, and a spring for biasing the washer to abut with the bracket in the latched position.

9. The apparatus of claim 8 further comprising, in combination: an adapter element having a slot, with the adapter element being slideably received in the block, with the slot slideably receiving the first and second guide plates, with the first and second guide plates being held by the slot with the first surfaces of the linear portions of the first and second guide plates abutting together when slideably received in the slot.

10. The apparatus of claim 9 wherein the mount includes a slit of a size for slideable receipt of the first and second guide plates, with the first and second guide plates being held by the slit with the first surfaces of the linear portions of the first and second guide plates abutting together when slideably received in the slit.

11. The apparatus of claim 10 wherein the slot and the slit each include an upper surface lying in a plane which is intersected by the driven roll; and wherein the slot and the slit each include a lower surface parallel to the upper surfaces of the slot and slit and spaced a distance generally equal to the thickness of the first and second guide plates with the first surfaces of the linear portions abutting; and wherein the slot includes an entry portion extending toward the slit at an angle which is nonparallel to the lower surface and away from the upper surface, with the entry portion allowing the first guide plate to be inserted in the slit and the slot by movement parallel to the movement direction of the wire and past the driven roll.

12. The apparatus of claim 9 wherein the block includes an aperture for slideably receiving the adapter element, includes a collapsible cut allowing the aperture to clamp upon the adapter element, and includes a bolt extending across the collapsible cut for collapsing the cut, with the bolt securing an electrical connection to the block, with the block and the adapter element being formed of electrically conductive material.

13. The apparatus of claim 12 further comprising, in combination: an electrical insulator for slideable receipt on the adapter element and for receipt in an aperture formed in a cabinet for providing mechanical support to the adapter element by the cabinet and electrically insulating the adapter element from the cabinet.

14. The apparatus of claim 5 further comprising, in combination: a mount including a slit of a size for slideable receipt of the first and second guide plates, with the first and second guide plates being held by the slit with the first surfaces of the linear portions of the first and second guide plates abutting together when slideably received in the slit.

15. The apparatus of claim 14 further comprising, in combination: an adapter element having a slot, with the slot slideably receiving the first and second guide plates, with the first and second guide plates being held by the slot with the first surfaces of the linear portions of the first and second guide plates abutting together when slideably received in the slot.

16. The apparatus of claim 15 wherein the slot and the slit each include an upper surface lying in a plane which is intersected by the driven roll; and wherein the slot and the slit each include a lower surface parallel to the upper surfaces of the slot and slit and spaced a distance generally equal to the thickness of the first and second guide plates with the first surfaces of the linear portions abutting; and wherein the slot includes an entry portion extending toward the slit at an angle which is nonparallel to the lower surface and away from the upper surface, with the entry portion allowing the first guide plate to be inserted in the slit and the slot by movement parallel to the movement direction of the wire and past the driven roll.

17. The apparatus of claim 5 further comprising, in combination: a block; and an adapter element having a slot for slideably receiving the first and second guide plates; wherein the block includes an aperture for slideably receiving the adapter element, includes a collapsible cut allowing the aperture to clamp upon the adapter element, and includes a bolt extending across the collapsible cut for collapsing the cut, with the bolt securing an electrical connection to the block, with the block and the adapter element being formed of electrically conductive material.

18. The apparatus of claim 17 further comprising, in combination: an electrical insulator for slideable receipt on the adapter element and for receipt in an aperture formed in a cabinet for providing mechanical support to the adapter element by the cabinet and electrically insulating the adapter element from the cabinet.

19. The apparatus of claim 17 wherein the slot of the adapter element slideably receives the first and second guide plates, with the first and second guide plates being held by the slot with the first surfaces of the linear portions of the first and second guide plates abutting together when slideably received in the slot.

20. The apparatus of claim 5, with the first surface of the linear portion being generally planar and with at least one of the guide plates including a trough extending through the linear portion having a size for slideable receipt of the wire.

21. Apparatus for directing wire having a diametric extent comprising, in combination: a guide for receipt of the wire, with the guide including a first opening through which a driven roll extends to engage the wire received in the guide; a second opening in the guide opposite to the first opening; and a pressure roll moveable relative to the driven roll between a drive position and a disengaged position, with the pressure roll extending through the second opening in the guide and engaging with the wire in the drive position, with the wire being captured between the driven roll and the pressure roll in the drive position, with the guide being removably slideably received relative to the driven roll and the pressure roll when the pressure roll is in the disengaged position and held from sliding by the receipt of the driven roll in the first opening and of the pressure roll in the second opening when the pressure roll is in the drive position.

22. The apparatus of claim 21, with the guide including a first guide plate having the first opening and a second guide plate having the second opening, with the wire being received between the first and second guide plates, with the first and second guide plates being slideable relative to each other and to the wire, with the second guide plate holding the first guide plate relative to the wire and the second guide plate being held relative to the first guide plate and to the wire by the receipt of the pressure roll in the second opening, with the first and second guide plates being removable and replaceable without tools.

* * * * *